June 11, 1968 L. K. ANDERSON ETAL 3,387,909
APERTURE-LIMITED OPTICAL WAVE COUPLER
Filed Aug. 7, 1963 2 Sheets-Sheet 1

INVENTORS L. K. ANDERSON
M. Di DOMENICO, JR.
BY
ATTORNEY

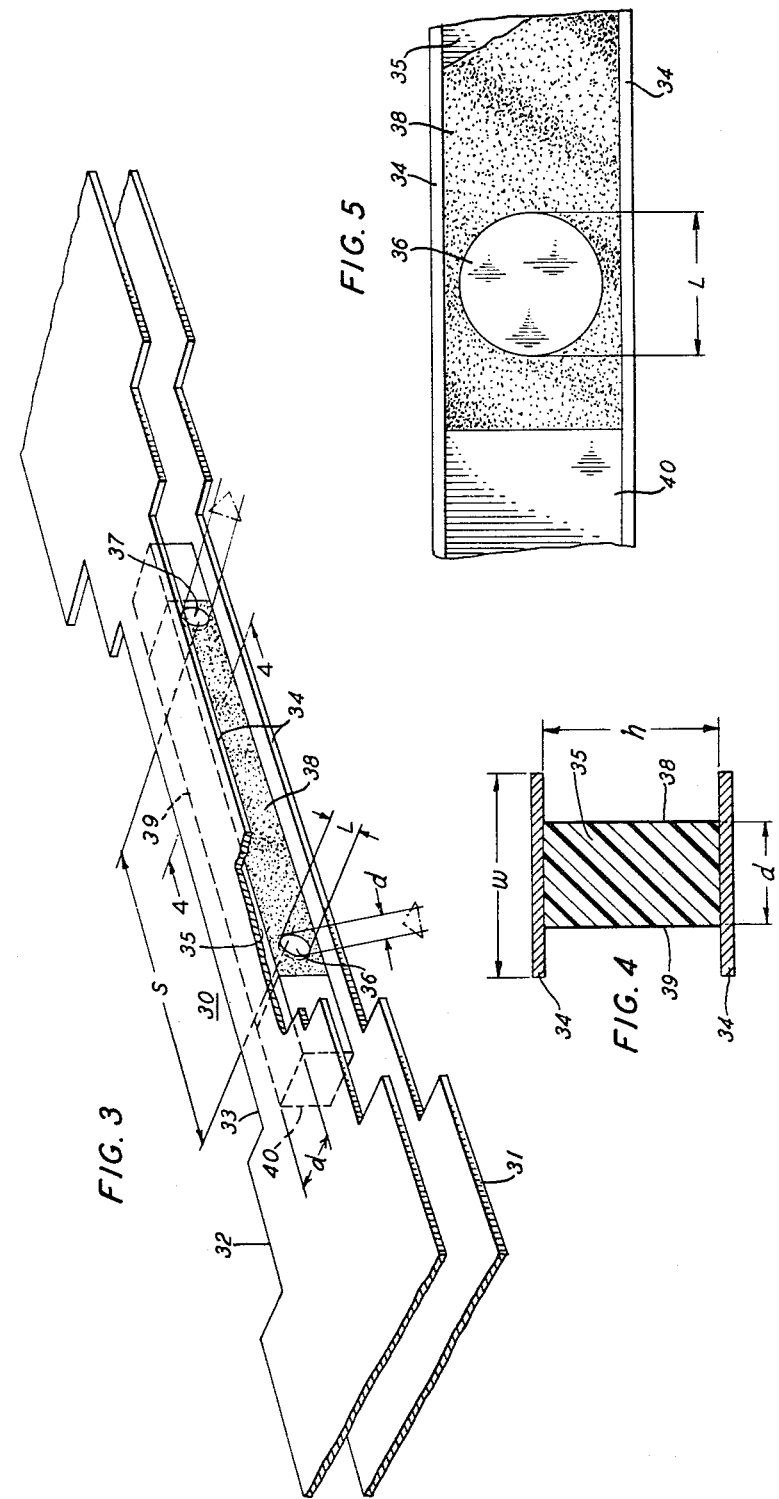

United States Patent Office 3,387,909
Patented June 11, 1968

3,387,909
APERTURE-LIMITED OPTICAL
WAVE COUPLER
Lawrence K. Anderson, Plainfield, and Mauro Di Domenico, Jr., Basking Ridge, N.J., assignors to Bell Telephone Laboratories, Incorporated, New York, N.Y., a corporation of New York
Filed Aug. 7, 1963, Ser. No. 300,513
3 Claims. (Cl. 350—96)

ABSTRACT OF THE DISCLOSURE

This application describes an optical wave coupler for entrapping a beam of optical wave energy between a pair of spaced mirrors. Coupling is through an aperture in one of the mirrors. It is shown that for a fixed angle of incidence, the separation between mirrors, and the reflectivity at the aperture, can be chosen so that substantially all of the incident wave energy is trapped between the mirrors.

---

Figure 1:
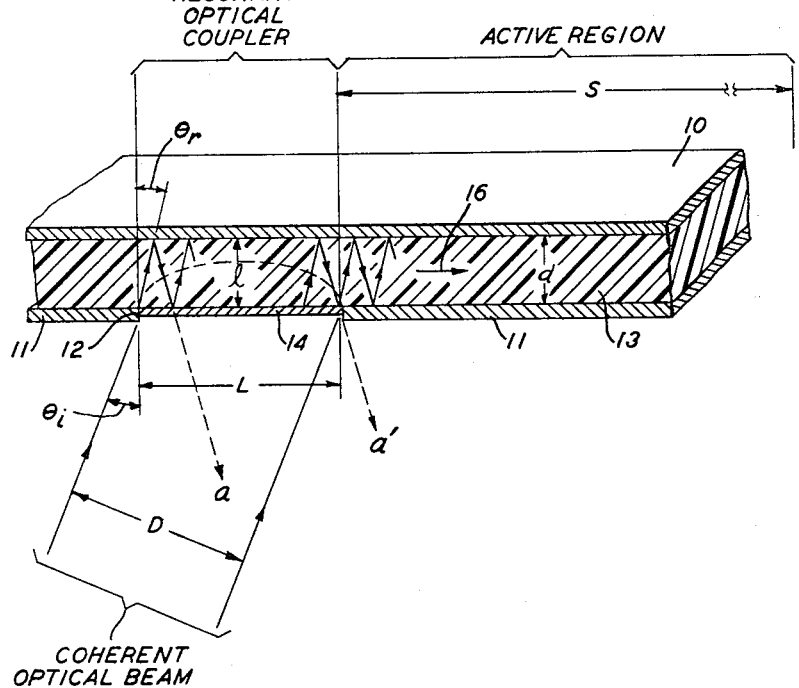

This invention relates to electromagnetic wave transmission systems and, in particular, to devices for coupling optical wave energy into a zig-zag optical device.

With the advent of the optical maser as a source of coherent, highly monochromatic wave energy, numerous devices have been devised for utilizing this source of energy in communications systems. For example, in an article entitled, "Wide-Band Microwave Light Modulation," by W. W. Rigrod and I. P. Kaminow, published in the January 1963 issue of the Proceedings of the Institute of Electrical and Electronics Engineers, there is described an optical modulator which operates in the so-called "zig-zag" configuration. In this type of device the optical wave to be modulated is reflected back and forth in an electro-optical medium in such a way as to cumulatively interact with the modulating microwave signal which simultaneously propagates within the medium. Because the optical wave is incident upon the reflecting surfaces at an angle, it progresses along the modulator from the input end to the output end.

To operate modulators of this type with minimum modulating power, the thickness of the electro-optical material must be correctly chosen. With currently available materials, however, it is found that this optimum thickness tends to be so small that if a simple aperture is used the incident optical wave does not stay within the modulator. Instead, it is found that after the first reflection the optical wave has not progressed sufficiently so as to clear the input aperture. As a result, most of it passes out through the input aperture and is lost.

Accordingly, it is an object of this invention to couple more efficiently coherent, optical wave energy to a zig-zag optical device.

It is a more specific object of this invention to resonantly trap in such a device substantially all of the incident optical wave energy within the coupling region and allow it to leak off into the active region of the device.

In accordance with the invention, the coupler comprises two parallel reflecting surfaces separated by a dielectric material in the configuration of a Fabry-Perot optical resonator. Optical wave energy incident upon the resonator at a specific angle of incidence is trapped within the coupler and, after a number of successive reflections, progresses out of a side of the coupler into the active portion of the optical device.

It is shown hereinbelow that for a fixed angle of incidence, the separation and reflectivity of the surfaces in the coupler can be chosen so as to directionally couple substantially all of the incident wave energy into the optical device. More specifically, it is shown that using currently available high dielectric electro-optical materials, such as strontium titanate, a practical coupler having a baseband bandwidth in excess of 5 gigacycles per second can be realized.

Coupler of the type to be described can be used over an optical frequency range which includes the infrared, the visible and the ultraviolet portion of the frequency spectrum. As used hereinafter, the term "optical" wave energy shall be understood to include wave energy in these three portions of the spectrum.

Figure 2:
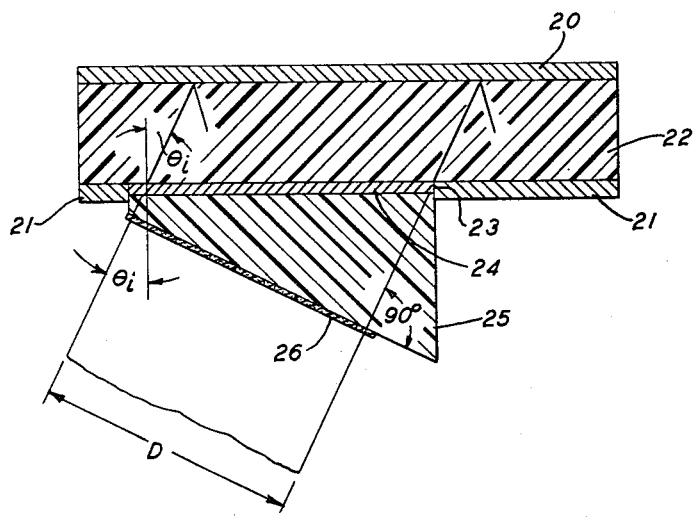

These and other objects and advantages, the nature of the present invention, and its various features, will appear more fully upon consideration of the various illustrative embodiments now to be described in detail in connection with the accompanying drawings, in which:

FIGS. 1 and 2 show two different embodiments of the optical coupler in accordance with the invention; and FIGS. 3, 4 and 5 are detailed views of a baseband modulator utilizing an optical coupler of the type shown in FIGS. 1 and 2.

Referring to FIG. 1 there is shown an illustrative embodiment of the invention comprising an upper reflecting surface 10 and a lower reflecting surface 11. These surfaces are "perfect" reflectors or mirrors in the sense that preferably they have reflectivities of close to 100 percent. If the device is an optical wave modulator of the type described by Rigrod and Kaminow, these surfaces can define a portion of a microwave transmission line along which the modulating signal propagates.

Located in the lower surface 11 is an aperture 12 of cross-sectional dimension L through which the incident beam of coherent optical wave energy enters the coupler. The aperture is typically round or square and is sufficiently small, compared to the wavelength of the modulating wave, so as not to interfere with its propagating along the transmission line defined by surfaces 10 and 11.

The region between the upper and lower surfaces is filled with a suitable electro-optically active dielectric material 13 having an index of refraction $n$. Conveniently, the electro-optical material also extends into the coupling region between the upper surface 10 and the aperture 12. However, insofar as it relates to the operation of the coupler, any optically suitable dielectric material can be used in the coupling region.

In a coupler, in accordance with the invention, the amount of optical wave energy that is coupled into the device is a function (among other things) of the reflectivity of the surface upon which the optical wave energy is incident. While the required reflectivity, for any particular purpose, may be provided by the electro-optical material itself, more generally separate means are provided for this purpose. Such means can take the form of a coating placed upon the electro-optical material or, alternatively, a dielectric multilayer designed to have the desired reflectivity at the frequency of the optical wave can be used. Accordingly, there is included in the illustrative embodiment of FIG. 1, a separate reflecting element 14 for providing the necessary reflectivity at the coupler aperture.

In the following discussion it is assumed that the medium surrounding the coupler has an index of refraction of unity. If, in a particular application this is not so, suitable corrections in the various formulae to be given hereinbelow can be made by those skilled in the art.

As described in the above-mentioned article by Rigrod and Kaminow, broadband modulation requires that the modulating structure have little dispersion, which makes propagation of the modulation signal in a TEM or a TEM-like mode advantageous. Thus, by way of illustration, the reflecting surfaces 10 and 11 can be the conductive members of a two-conductor strip transmission line.

Two distinctly different modes of operation are possible. In the first mode, the electric vector of the modulating electric field lies in the optical plane of incidence. This is called the 0°-modulator. In the second mode, the modulating electric field is perpendicular to the optical plane of incidence. This latter arrangement is called the 90°-modulator. The TEM modulating wave can be propagated in the electro-optical medium in the 90°-modulator by making the reflecting surfaces of nonconducting, dielectric multilayers. In either mode, the modulating wave energy is introduced into the device on one side of the coupler. The region on the other side of the coupler is occupied in common by the optical wave and the modulating wave and it is in this region that interaction (i.e., modulation) occurs. In a practical device, a second coupling aperture is provided at the opposite end of the interaction region through which the modulated optical wave is extracted.

In the coupler shown in FIG. 1, the cross-sectional dimension L of aperture 12 and the spacing $l$ between elements 10 and 14 are typically much larger than the wavelength of the optical wave. Accordingly, the structure can be analyzed in terms of plane waves bouncing back and forth between reflecting surfaces.

It is evident from FIG. 1 that in the absence of special precautions, a portion of the optical wave, incident upon mirror 10 at an angle $\theta_r$, would be reflected and would re-emerge through the input aperture. More particularly this would occur if the length L of the input aperture is greater than $2l \tan \theta_r$. This is illustrated in FIG. 1 wherein the dotted lines $a$ and $a'$ show the portion of the reflected beam that would be lost in this manner.

To further illustrate this problem, in an optimum design the distance, $d$, between reflectors and the length, $S$, of the modulator are determined by the electrical properties of the modulating medium both at microwave and optical frequencies. For highly transparent, low-loss microwave materials of high dielectric constant (e.g., strontium titanate), $d$ is nominally in the order of a few tenths of a millimeter and $S$ is usually several centimeters. The beam width, $D$, is chosen to be as small as possible and yet remain within the diffraction limits of the device over the length of the device. Thus, based upon operational practicalities and diffraction limits, D is normally about a millimeter. Thus, the beam width D and, hence, the aperture dimension L, which is related to D by $$L = D(1 - n^2 \sin^2 \theta_r)^{-\frac{1}{2}} \quad (1)$$

or, in terms of the angle of incidence $\theta_i$, by $$L = D/\cos \theta_i \quad (2)$$

is, typically, between five and ten times larger than the spacing between reflectors. As a result of this, a large portion of the beam bounces out of the coupler through the input aperture 12 after one reflection and, hence, cannot be confined within the active region of the device by means of a simple aperture.

This input loss can be avoided, and virtually all of the incident optical wave energy coupled to the optical device, by means of an appropriate optical coupler. In accordance with the invention such coupling is effected by resonant trapping of the incident wave by means of a Fabry-Perot resonator. By properly adjusting the spacing $l$ between the upper surface 10 and the deflecting surface 14 in aperture 12, the portion of the reflected wave that would normally bounce out of the input aperture is cancelled. The energy is then trapped between reflecting surfaces 10 and 11 and walks off into the modulator in a direction parallel to these surfaces as indicated by arrow 16.

The spacing $l$ between reflecting surfaces in the coupling region is found from the resonance condition $\beta_x l = m\pi$ which gives $$l = \frac{m\lambda}{2n \cos \theta_r} \quad (3)$$

where:

$\beta_x$ is the component of the propagation constant in the direction perpendicular to the reflecting surfaces, $\lambda$ is the wavelength of the optical wave in free space, and $m$ is an integer.

Advantageously, $m$ is selected such that $l$ is approximately equal to $d$.

In terms of the external angle of incidence $\theta_i$, $$l = \frac{m\lambda}{2n\sqrt{1 - \frac{\sin^2 \theta_i}{n^2}}} \quad (4)$$

To achieve velocity matching in the electro-optical material requires that $$\sin \theta_r = \frac{n}{\sqrt{k'}} \quad (5)$$

where $k'$ is the real part of the microwave dielectric constant of the electro-optical material.

Substituting (5) in (4) and applying Snell's law, gives $$l = \frac{m\lambda}{2n\sqrt{1 - \frac{n^2}{k'}}} \quad (6)$$

As indicated earlier, the amount of optical wave energy that is coupled in varies as a function of the reflectivity of surface 14. It can be shown that for 100 percent transmission into the modulator, the reflectivity of the input surface 14 is given by $$R = \left(\frac{1-r}{1+r}\right)^2 \quad (7)$$

where the dimensionless constant, $r$ is given by $$r = \frac{l}{2D} \sin \theta_r \cos \theta_r \sqrt{1 - n^2 \sin^2 \theta_r} \quad (8)$$

In terms of the angle of incidence $\theta_i$, the constant $r$ is given by $$r = \frac{l}{2D} \frac{\sin \theta_i \cos \theta_i}{n} \sqrt{1 - \frac{\sin^2 \theta_i}{n^2}} \quad (8')$$

The embodiment of FIG. 1 is based upon the assumption that the angle $\theta_r$ required to achieve velocity matching (as defined by Equation 5) does not exceed the maximum achievable angle of refraction $\theta_{r\ max}$ as given by $$\sin \theta_{r\ max} \frac{1}{n} \quad (9)$$

In terms of the angle of incidence, velocity matching is achieved when $$\sin \theta_i \frac{n^2}{\sqrt{k'}} \quad (10)$$

When $n^2 > \sqrt{k'}$, such as with cuprous chloride, the arrangement of FIG. 1 cannot be employed. Instead, a modified embodiment, such as is shown in FIG. 2 is used.

The embodiment of FIG. 2, which in basic concept is the same as that shown in FIG. 1, comprises a pair of reflecting surfaces 20 and 21 and an electric-optical material 22 therebetween. As before, there is an aperture 23 in the lower surface 21 and a reflector 24 disposed within the aperture. However, in the embodiment of FIG. 2, there is, in addition, a wedge 25 of a second dielectric material extending below aperture 23. Material 25 is transparent to the optical beam and, has an index of refraction $n_1$ that is selected such that $$n^2 < n_1 \sqrt{k'} \quad (11)$$

Typically, the wedge and th eelectro-optical medium are made of the same material so that $n = n_1$.

The surface exposed to the incident beam is preferably oriented perpendicular to the beam wavefront and is covered with an anti-reflection coating 26. (For a discussion of anti-reflection coatings see "Optical Properties of Thin Solid Films" by O. S. Heavens, published by Academic Press, Inc., New York 1955.)

With the coupler so constructed, the incident wave enters through the external wedge and, if the refractive indices of the wedge and the electro-optical material are equal, the incident beam is not refracted. Thus, in the embodiment of FIG. 2, $\theta_i$ is equal to $\theta_r$. The design of the coupler is then the same as described hereinabove except that now the term $(1-n^2 \sin^2 \theta_r)^{1/2}$ is replaced by $\cos \theta_i$ and the expression for the dimensionless parameter, $r$, given by Equation 8, reduces to $$r = \frac{l}{2D} \sin \theta_i \cos^2 \theta_i \qquad (12)$$

In the above discussion, a resonant coupler is used to couple optical wave energy into an optical device. It is evident that precisely the same type of coupler can be used as an output coupler. However, when used as an output coupler, such a coupler only transmits half of the optical wave.

FIG. 3 is an illustrative embodiment of a baseband modulator employing an optical coupler of the type described hereinabove. The modulator is a 90°-modulator using strontium titanate ($SrTiO_3$) as the electro-optical material.

Referring more specifically to FIG. 3, the modulating signal, which in the instant case is a baseband signal, is supplied to the modulator section 30 from a 50 ohm strip transmission line 31 through a matching transformer 32 and a short length of reduced-width line 33. The line 33 is loaded with a slab of matching dielectric 40, such as alumina, for minimizing any tendency for mismatch at the modulating frequency.

The modulator 30, including the coupling region, comprises a section of strip transmission line 34 for guiding the modulating signal and the slab of electro-optical material 35.

Being a 90°-modulator, the optical beam input aperture 36 is located in a side of the slab 35, midway between the conductive members of line 34. The optical beam is confined within the slab by means of dielectric multilayer reflectors 38 and 39 whose reflectivities are greater than 99 percent at 6328 A. the wavelength of the optical beam.

An output aperture 37 is located at the output end of the modulator. The over-all length, S, of the modulator is 1.4 cm.

FIG. 4 is a cross-sectional view of the modulator showing the line 34, the electro-optical slab 35 and the multilayer reflectors 38 and 39. The width $w$ of the line is 0.5 mm. Its height $h$ is 1.3 mm. The width $d$ of the slab (that is, the distance between reflectors 38 and 39) is 0.2 mm.

FIG. 5 is a detailed view of the input aperture 36 showing its location in the side of slab 35 between the conductive members of line 34. The diameter L of the aperture is 1.1 mm.

As the microwave dielectric constant $k'$ for strontium titanate at room temperature is 300 and the optical index of refraction $n$ is 2.409 at 6328 A., the design of the input and output couplers is as follows:

(1) Internal angle:

$$\theta_r = \sin^{-1} \frac{n}{\sqrt{k'}} = 8.0°$$

(2) External angle:

$$\theta_i = \sin^{-1}(n \sin \theta_r) = 19.8°$$

(3) Coupler thickness $l$:

$$l = \frac{m\lambda}{2n \cos \theta_r} \approx 1.33 \times 10^{-5} \times m \text{ cm.}$$

Since $d = 0.2$ mm., this implies operating with a value of $m$ of about 1500. The actual thickness $l$ is accurately adjusted by polishing.

(4) Reflectively at the aperture:

$$r = \frac{l}{2D} \sin \theta_r \cos \theta_r \sqrt{1 - n^2 \sin^2 \theta_r}$$

$r = 1.29 \times 10^{-2}$ computed for a beam width $D = 1$ mm

Thus, $R = \left(\frac{1-r}{1+r}\right)^2 = 94.8\%$ (5) Coupler bandwidth, defined as the 3 decibel width of the optical coupler resonance is given by $$\delta f = \frac{1}{\pi} \frac{c}{D} \frac{\sin \theta_r}{n} \sqrt{1 - n^2 \sin^2 \theta_r}$$

$$\delta f = 5.2 \times 10^9 \text{ cycles/second}$$

where $c$ is the velocity of light

This computes to be 5.2 gc./sec. Thus, the base bandwidth is 2.6 gc./sec.

The optical insertion loss for the modulator is 7 decibels which includes a 3 decibel loss at the output aperture and a 4 decibel loss through the electro-optical medium. The modulating power required is about 130 milliwatts.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical wave coupler for entrapping a beam of optical wave energy between a pair of spaced, essentially totally reflective, mirrors including;
    a dielectric material having an index of refraction $n$ disposed between said mirrors;
    an aperture of cross sectional dimension L in one of said mirrors through which said beam of opitcal wave energy is introduced into the region between said mirrors;
    and a reflecting element disposed within said aperture having a reflectivity $$R = \left(\frac{1-r}{1+r}\right)^2$$

where:

$$r = \frac{l}{2D} \frac{\sin \theta_i \cos \theta_i}{n} \sqrt{1 - \frac{\sin^2 \theta_i}{n^2}}$$

$\theta_i$ is the angle of incidence of said beam;
    D is the cross-sectional dimension of the beam and is equal to L $\cos \theta_i$, and
    $l$ is the distance between the mirrors in region of the aperture, and is equal to an integral multiple of half wavelengths with respect to the optical propagation constant of the material in the direction perpendicular to the mirrors.

2. The arrangement according to claim 1 wherein said mirrors are supportive of a modulating signal propagating therealong in a TEM-like mode:
    said modulating signal and said optical beam propagate therealong together;
    and wherein the angle of incidence $\theta_i$ of said beam and the dielectric constant $n$ of said material are related by $$\sin \theta_i = \frac{n^2}{\sqrt{k'}}$$

where
    $k'$ is the real part of the dielectric constant of said material at the frequency of the modulating signal.

3. An optical wave coupler for entrapping a beam of optical wave energy between a pair of spaced, essentially totally reflective, mirrors including;

a first dielectric material having an index of refraction $n$ disposed between said mirrors;

an aperture of cross-sectional dimension L in one of said mirrors through which said beam of optical wave energy is introduced into the region between said mirrors at an angle of incidence $\theta_i$;

reflective means having a reflectivity $$R = \left(\frac{1-r}{1+r}\right)^2$$

disposed within said aperture where $$r = \frac{l}{2D} \sin \theta_i \cos^2 \theta_i$$

D is the cross-sectional dimension of the beam and is equal to $L \cos \theta_i$, and $l$ is the distance between the mirrors in the region of said aperture and is equal to an integral multiple of half wavelengths with respect to the optical propagation constant of the material in the direction perpendicular to the mirrors;

and a second dielectric material having the same index of refraction $n$ contiguous to said reflective means wherein the surface of said second material exposed to said beam makes an angle of $\theta_i$ with said reflective means, and wherein said beam is normal to said surface.

References Cited

UNITED STATES PATENTS

| | | | |
|---|---|---|---|
| 2,220,861 | 11/1940 | Blodgett | 350—164 |
| 2,589,930 | 3/1952 | Dimmick et al. | 350—166 |
| 2,590,906 | 4/1952 | Tripp | 350—166 |
| 3,278,749 | 10/1966 | Seidel | 350—160 X |

JOHN K. CORBIN, *Primary Examiner*.

JEWELL H. PEDERSEN, *Examiner*.